Figure 1:
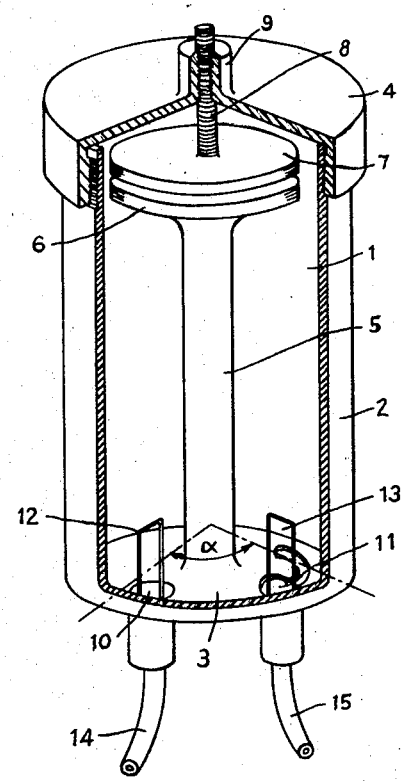

June 3, 1958   R. O. GOUBLIN-KORSTEN ET AL   2,837,722
TUNED CAVITY SYSTEMS
Filed Jan. 18, 1956

Inventors
ROGER OCTAVE GOUBLIN - KORSTEN &
JEAN DUBOIS
By
Stone, Boyden + Mason
Attorneys 2,837,722

TUNED CAVITY SYSTEMS

Roger Octave Goublin-Korsten, Saint-Cloud, and Jean Dubois, Paris, France, assignors to Compagnie Francaise Thomson-Houston, Paris, France, a French body corporate Application January 18, 1956, Serial No. 559,944

Claims priority, application France January 21, 1955

4 Claims. (Cl. 333—82)

The present invention relates to resonant cavities capable of being tuned to a chosen frequency or band of frequencies.

One such cavity of known type comprises a tubular envelope for example a cylindrical envelope which is conducting at least on its internal surface and formed at one of its extremities with a platelike end conductor at least on its internal surface, joined electrically to the said envelope. This plate carries, preferably in its centre, a conductor to which it is joined electrically, and which is preferably perpendicular to it and therefore parallel to the axis of the said envelope. This latter conductor terminates at its end opposite to the said plate with a widened portion which may take various forms and which is arranged opposite to a member joined electrically and mechanically to a cover member situated at the end of the said envelope opposite to the said plate. The electrical capacity present between these parts can be modified by various known means, including variations in the surfaces opposite each other and/or in the distance between the said widened portion and the said member, which modifies in a known manner the tuned frequency of the said cavity.

It is known that such a cavity can be excited by coupling it either magnetically or electrically to an input coupling circuit connected to a high frequency current. Similarly, a fraction of the energy in the cavity can be removed, by means of an output coupling circuit of an electric or magnetic type, which may be adjusted as desired. It is well known that the power transformation constant, measured between the said input coupling circuit and the said output coupling circuit provides an accentuated selectivity, the transfer being effected most efficiently for signals at the resonant frequency of the cavity, whilst it decreases rapidly when the frequency of the incident signals is spaced to one side or the other of the said resonant frequency.

The present invention has for an object to provide a coupling system adjustable in phase and in amplitude between the said input coupling circuit and output coupling circuit in order to obtain at a frequency distinct from the said resonant frequency and at a frequency distance from the latter which can be chosen as desired, a considerably higher attenuation than that which would result from the single mis-tuning of the cavity at the frequency considered. The obtaining of such a frequency known as a dip frequency is extremely valuable in the case of receivers of the superheterodyne type which are affected by interfering signals known as image frequency signals, spaced from the frequency to which the receiver is tuned by an amount equal to twice the intermediate frequency of the receiver. The said cavity is therefore tuned so that its resonant frequency coincides with that of the received signal and so that the dip frequency falls in the region of the image frequency.

According to the invention, the total coupling is adjusted between the said input and output coupling circuits in such a manner that for a certain frequency, distinct from the resonant frequency of the cavity, the voltage induced in the output coupling circuit by the signal present on the input coupling circuit must be almost in opposition to the voltage induced in the same output circuit by the current then circulating in the cavity (which is then mis-tuned, since the frequency considered, is distinct from the resonant frequency of the cavity) under the influence of the said signal present in the said input coupling circuit.

The total coupling considered comprises the direct coupling at the interior of the cavity between the input circuit and the output circuit, as well as any coupling which may exist between the two elements at the exterior of the said cavity.

According to a preferred embodiment of the invention, the couplings of the input and output with the said cavity are effected by means of loops passing through the end which as has been mentioned above forms one of the extremities of the tubular envelope. These loops are each, in effect, in a plane radial to the said envelope. The applicants have established that one can vary the direct coupling between the input and output loops without substantially modifying the matching conditions of each of these loops to the cavity, by modifying the angular spacing between the radial planes of the said loops. One of these loops can therefore be made to pivot but this then also modifies the coupling with the cavity. According to a preferred embodiment of the invention, there is added to the exterior of the cavity a magnetic coupling between the input and output coupling circuits in a direction appropriate to the technical characteristics. It will be understood that other methods of electrical or mechanical coupling are possible.

Figure 2:
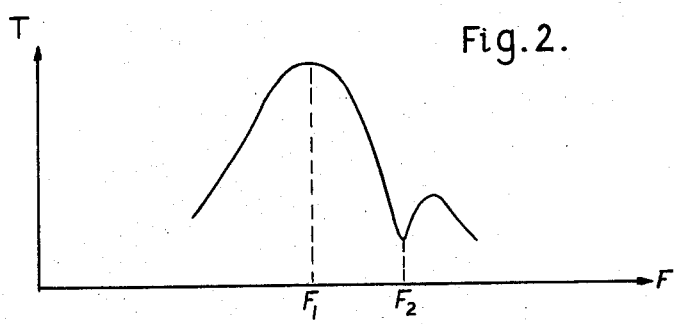

In order that the invention may be more fully understood, reference will now be made to the accompanying drawings in which:

Figure 1 is a diagrammatic perspective view, partially cut away, of a tuned cavity according to the invention, and Figure 2 is a characteristic curve.

In Figure 1 there is shown a cavity 1, formed within a cylindrical member 2, closed by a plate 3 at one end and by a cover 4 at the other end. Along the axis of the said cylindrical member 2, shown partly cut away, there can be seen a conductor 5 having a widened disclike end 6, opposite to which is arranged at plate 7 joined electrically to the cover 4. The distance between the members 6 and 7 is adjustable by means of a threaded rod 8 carrying the plate 7, which is mounted so as to rotate in the threaded bush 9, in order to tune the cavity to the desired frequency.

At 10 and 11 are provided two openings into the plate 3, through which pass the input coupling loop 12 and the output coupling loop 13 joined to the co-axial type cables 14 and 15 respectively. The angular spacing α existing between the planes of the loops with respect to the axis of the cavity, is one of the elements enabling to define and to adjust to the desired value, the spacing between the resonant frequency of the cavity and the dip frequency. This angular spacing can be varied by altering the position of the loop 13 along the arcuate slot portion of the opening 11.

Figure 2 shows a curve illustrating variation of the power transfer on the ordinate as a function of the working frequency on the abscissae. The power transfer is measured between the output circuit and the input circuit. The resonant frequency $F_1$ and the dip frequency $F_2$ will be noted.

Advantageously, one may arrange two or more cavities according to the invention in series.

The spacing between the resonant frequency and the dip frequency varies when the tuned frequency of the cavity is altered. This spacing may be maintained substantially constant by making variations of the coupling between the input circuit and the output circuit in the appropriate direction, and in particular by varying the part of this coupling which takes place at the exterior of the cavity. However, this entails a certain mechanical complication and in the case where an assembly of cavities in cascade must be capable of being tuned over a band of frequencies, it has been found advantageous to vary the said spacing, but to give to it a different value in the different cavities so that this spacing takes the desired value (for example twice the value of the intermediate frequency) for the different frequencies in the band for the different cavities, for example respectively at one end of the band in one cavity and at the other end in the other cavity.

The applicants have established that in this way it is easier to achieve the attenuation in response to the image frequency, even with very low values of the intermediate frequency.

We claim:

1. A cavity resonator comprising a cylindrical casing closed at its ends, a metal piston within said casing having its stem supported by one of the ends of the casing and capable of moving along the axis of the cylinder, an enlarged portion fixed to the other end of the casing and opposite to the end of the piston, variation of the spacing between the piston and the enlarged portion varying the capacity of the resonator and consequently its tuned frequency, means for feeding energy to said cavity constituted by a first loop passing through said other end of the cylinder and situated in a plane passing through the axis of said cylinder, a second loop for withdrawing output energy from said cylinder, said second loop passing through said other end of the cylinder and being situated in another axial plane of said cylinder, and means for adjusting the angular spacing between the two axial planes containing the two loops.

2. In a cavity resonator comprising a closed cylindrical cavity tuned to its resonant frequency, an input and output coupling system comprising an input loop extending through one end of the cavity and situated in an axial plane of the cylinder, an output loop extending through said one end of the cavity and situated in a second axial plane of the cylinder, and the angular spacing between said two axial planes containing said loops being adjusted to produce a fall in the output energy from the cavity at a frequency spaced from the resonant frequency of the cavity.

3. A cavity resonator comprising a cylindrical casing closed at its ends, means for varying the capacity of the resonator and consequently its tuned frequency, a first loop, for feeding energy to said cavity, passing through one end of the cylinder and situated in a plane passing through the axis of said cylinder, a second loop, for withdrawing output energy from said cylinder, passing through said one end of the cylinder and situated in another axial plane of the cylinder, at least one of said two loops being movable about the axis of the cylinder by rotation of its respective axial plane about said axis.

4. In a superhet receiver, a cavity resonator comprising a cylindrical casing closed at its ends, means for tuning the cavity to the frequency of a signal to be received, a first loop for feeding said received signal frequency to said cavity passing through one end of the cylinder and situated in a plane passing through the axis of said cylinder, a second loop, for withdrawing output energy at said received signal frequency from said cylinder, passing through said one end of the cylinder and situated in another axial plane of the cylinder, and the angular spacing between the two axial planes of said loops being adjustable to produce a fall in the output energy at the image frequency of the receiver equal to twice the intermediate frequency.

References Cited in the file of this patent

UNITED STATES PATENTS 2,603,754     Hansen _____ July 15, 1952
2,693,582     Skar _____ Nov. 2, 1954